June 2, 1925.
I. H. SMITH
ADVERTISING DEVICE
Filed Aug. 9, 1923
1,540,658
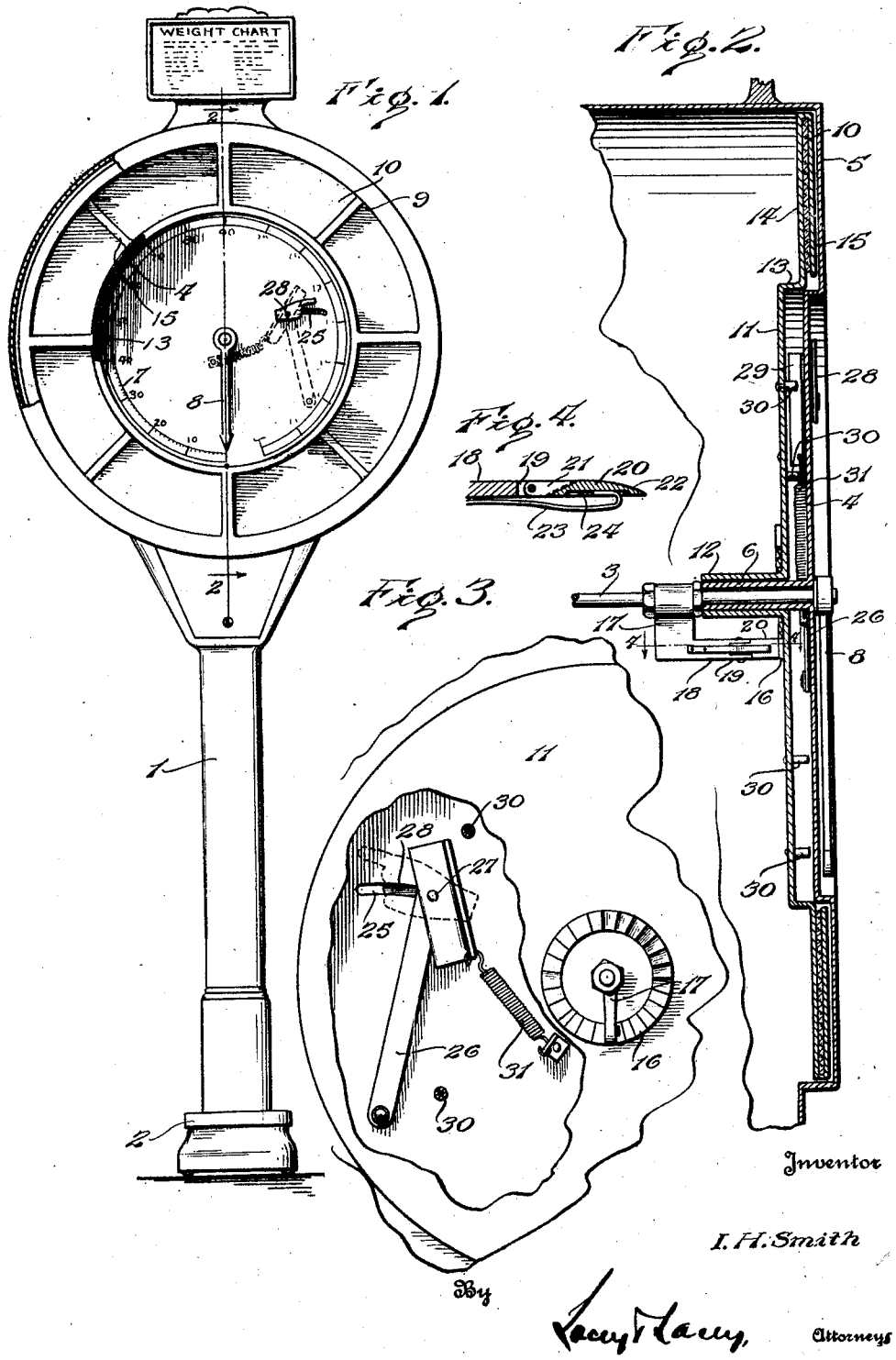
Inventor
I. H. Smith
By Lacey & Lacey, Attorneys Patented June 2, 1925.

1,540,658

UNITED STATES PATENT OFFICE.

IRA HUGH SMITH, OF GREENEVILLE, TENNESSEE.

ADVERTISING DEVICE.

Application filed August 9, 1923. Serial No. 656,623.

*To all whom it may concern:*

Be it known that I, IRA HUGH SMITH, a citizen of the United States, residing at Greeneville, in the county of Greene and State of Tennessee, have invented certain new and useful Improvements in Advertising Devices, of which the following is a specification.

My invention relates to advertising devices and has for its object the provision of an inexpensive attachment for weighing scales so constructed as to be capable of displaying a number of announcements and automatically operated to move the announcements about the weight dial as the scale is operated. The invention provides a movable sign carrier mounted concentrically with and about the dial of the scale and includes a device which is actuated by the rotation of the index member of the scale so as to call attention to the announcements. The invention is illustrated in the accompanying drawing and consists in certain novel features which will be hereinafter fully set forth.

In the drawing:

Figure 1 is a front elevation of a weighing scale having my attachment applied thereto;

Fig. 2 is an enlarged vertical section on the line 2—2 of Fig. 1;

Fig. 3 is a rear elevation, partly broken away, of a part of the sign device, and Fig. 4 is a detail section on the line 4—4 of Fig. 2.

The weighing scale may be of any well-known form and is illustrated as comprising a pedestal 1 rising from a platform 2 and housing mechanism which actuates a shaft 3 when a person steps upon the platform. The scale is shown as including a dial 4 fixed to the upper casing 5 of the scale and having an elongated hub 6 constituting a bearing for the shaft 3. Graduations, indicated at 7, are, of course, provided upon the face of the dial 4, and to the front end of the shaft 3 is secured a pointer or index finger 8 which plays over the dial in the usual manner. The upper portion of the casing 5 is, in the present instance, so constructed as to provide a plurality of open spaces 9 around the edge of the dial 4 and through which announcements upon a sign carrier may be read. These announcements may be painted or otherwise displayed directly upon the carrier, but I prefer to employ cards, indicated at 10, held by the outer peripheral portion of the sign carrier which consists of a disk 11 having a hub 12 loosely mounted upon the hub 6 of the dial 4. The disk 11 has its edge or peripheral portion turned forwardly toward the dial, as shown at 13, and then carried outwardly parallel with the central portion of the disk and doubled upon itself to provide the flanges 14 and 15 which are adapted to snugly receive the announcement cards 10 and thereby retain the said cards in place. The outer flange 15 is preferably of the open construction employed in the frame 5 whereby spaces are defined to mark off and separate the different announcements. On the inner or rear side of the disk 11 adjacent and concentric with the hub 12 thereof I provide a circular series of ratchet teeth 16, and in rear of the hubs 6 and 12, I secure to the index shaft 3 a bracket 17 having an arm 18 extending forwardly parallel with the shaft. The front or outer end of this arm 18 is forked, as indicated at 19, and a pawl 20 is provided with a tongue 21 which is pivotally secured within the fork. The outer end of the pawl is beveled, as indicated at 22, whereby it may ride over the ratchet teeth 16 when moving in one direction but will engage said teeth and impart movement to the disk 11 when moving in the opposite direction. The pawl is yieldably held in engagement with the ratchet teeth by a spring 23 which is secured upon the arm 18 and has its free end playing in a groove 24 provided in the back of the pawl, as clearly shown.

In the dial 4 of the scale is formed an arcuate slot 25 and pivoted upon the back of the dial concentric with said slot is a rocking arm 26, said rocking arm carrying at its upper end a pin 27 which plays in the slot 25 and carries an indicator 28 upon its front end which may be in the form of a hand with the index finger pointing toward the periphery of the dial. Also secured to the upper end of the rocking arm 26 is a shoe 29, and upon the front side of the disk 11 I provide a plurality of projections 30 which are arranged in a circular series concentric with the hub of the disk and are adapted to ride against the shoe 29, as will be readily understood. Upon reference to Fig. 3 more particularly, it will be noted that the shoe 29 is so disposed that it will be presented obliquely to the projection 30 and, consequently, as the projection moves with the disk 11 it will push the shoe outwardly and thereby move the rocking arm 26 and the indicator 28 toward the periphery of the dial 4. A contractile spring 31 is attached to the shoe and to the dial so as to return the shoe, the indicator and the rocking arm to their initial positions when the projection 30 clears the shoe.

The operation of the device is thought to be clear from what has been said. When a person steps upon the platform 2, the shaft 3 will be rotated in the usual manner and the pointer 8 moved over the dial 4 so as to indicate the weight of the person. The bracket 17 and the arm 18 will, of course, turn with the shaft 3 and as the pawl 20 is in engagement with one of the teeth 16 the sign carrier will be rotated with the shaft. Inasmuch as the projections 30 are fixed to the disk 11 which constitutes the central body portion of the sign carrier, the said projections will ride successively against and past the shoe 29 and the indicator 28 will be oscillated so that the person standing upon the scale will have his attention directed to the several signs or announcements which are being rotated about the dial simultaneously with the pointer 8. When the pointer 8 comes to rest, the movement of the several sign cards will likewise cease and when the user of the scale steps off the platform, the pointer 8 will return to the zero position, as shown, the return movement of the pointer and the shaft 3 causing the bracket 17 and the arm 18 to travel reversely over the ratchet teeth 16 without actuating the sign carrier but setting the parts in position to again actuate the same the next time the scale is used.

My device is exceedingly simple in construction and compact in arrangement. It will operate automatically to call attention to the announcements displayed about the scale dial whenever the scale is used and, as the working parts are all housed within the casing of the scale, they are protected against tampering and are not apt to get out of order.

Having thus described the invention, what is claimed as new is:

1. The combination with the dial, the pointer and pointer shaft of a weighing scale, of a sign carrier mounted concentrically with the dial and displaying announcements about the periphery of the dial, a bracket secured to the pointer shaft in rear of the carrier and having an arm extending forwardly toward the carrier, a circular series of ratchet teeth on the back of the sign carrier concentric with the pointer shaft, and a pawl mounted on the side of the forwardly projecting arm of said bracket and adapted to engage the ratchet teeth upon movement of the shaft in one direction and to ride over the ratchet teeth upon movement of the shaft in the opposite direction.

2. The combination of a weighing scale dial having an arcuate slot formed therethrough, a pointer shaft extending centrally through the dial, a pointer carried by said shaft to move over the dial, a sign carrier concentric with the dial and displaying announcements at the periphery of the dial, means whereby said sign carrier will be rotated upon movement of the pointer and the pointer shaft in one direction, a rocking arm pivoted upon the back of the dial concentric with the slot therein, a shoe carried by said rocking arm, an indicator disposed in front of the dial, a pin connecting said indicator with the rocking arm and passing through the slot in the dial, yieldable means for holding the indicator at one end of the slot, and projections upon the sign carrier adapted to ride against the shoe and thereby move the indicator to the opposite end of the arcuate slot.

3. The combination with the dial and pointer of a weighing scale, of a sign carrier mounted concentric with the dial and displaying announcements around the periphery of the dial, an indicator mounted in front of the dial, and means on the back of the dial connected with said indicator and actuated by the sign carrier to reciprocate the indicator.

In testimony whereof I affix my signature.

IRA HUGH SMITH. [L. S.]